(12) United States Patent
Fay, II

(10) Patent No.: US 10,820,498 B2
(45) Date of Patent: Nov. 3, 2020

(54) ROTARY SICKLE CUTTING SYSTEM FOR AN AGRICULTURAL VEHICLE HAVING A PLURALITY OF CUTTING UNITS WITH A ROTATABLE DISC AND GUARD ASSEMBLY

(71) Applicant: CNH INDUSTRIAL AMERICA LLC, New Holland, PA (US)

(72) Inventor: Jeffrey Brown Fay, II, Oxford, PA (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 42 days.

(21) Appl. No.: 16/004,157

(22) Filed: Jun. 8, 2018

(65) Prior Publication Data

US 2019/0373809 A1 Dec. 12, 2019

(51) Int. Cl.
*A01D 34/66* (2006.01)
*A01D 34/73* (2006.01)

(52) U.S. Cl.
CPC ........... *A01D 34/66* (2013.01); *A01D 34/733* (2013.01)

(58) Field of Classification Search
CPC .... A01D 34/66; A01D 34/733; A01D 34/665; A01D 34/664; A01D 34/668; A01D 34/73; A01D 34/828; A01D 34/412; Y10S 56/20
See application file for complete search history.

(56) References Cited

U.S. PATENT DOCUMENTS

| | | | |
|---|---|---|---|
| 139,612 A | 6/1873 | Rarigh | |
| 149,670 A | 4/1874 | Mitten et al. | |
| 871,203 A | 11/1907 | Burhop | |
| 1,206,642 A | 11/1916 | Alchevsky | |
| 2,883,746 A * | 4/1959 | Gilsi | A01G 3/0535 30/205 |
| 3,596,451 A * | 8/1971 | Spear | A01D 34/73 56/255 |
| 3,971,199 A * | 7/1976 | Buchele | A01D 34/828 56/320.2 |
| 4,037,396 A * | 7/1977 | Buchele | A01D 34/828 56/255 |
| 4,227,365 A * | 10/1980 | van der Lely | A01D 34/664 56/13.6 |

(Continued)

FOREIGN PATENT DOCUMENTS

| | | |
|---|---|---|
| DE | 102011016284 A1 | 10/2012 |
| EP | 0057936 A2 | 8/1982 |

(Continued)

OTHER PUBLICATIONS

Extended European Search Report for EP Application No. 19178810.8 dated Nov. 4, 2019 (six pages).

*Primary Examiner* — Arpad Fabian-Kovacs
(74) *Attorney, Agent, or Firm* — Peter Zacharias

(57) ABSTRACT

An agricultural vehicle including a chassis and a header carried by the chassis that includes a cutterbar assembly with a plurality of cutting units. Each of the cutting units includes a rotatable disc carrying a plurality of knives each defining at least one cutting edge and a guard assembly including a plurality of extensions. Each of the extensions includes a bottom guard portion connected to a top guard portion to define a knife slot that allows the plurality of knives to pass through during rotation of the disc. At least one rotary driver couples to the rotatable disc of at least one of the cutting units.

20 Claims, 6 Drawing Sheets

(56) References Cited

U.S. PATENT DOCUMENTS

| | | | | |
|---|---|---|---|---|
| 4,594,842 A | * | 6/1986 | Wolters | A01D 43/082 56/119 |
| 4,736,573 A | * | 4/1988 | Seck | A01D 34/82 30/276 |
| 5,012,635 A | * | 5/1991 | Walters | A01D 34/665 56/13.6 |
| 5,551,220 A | * | 9/1996 | Suller | A01D 34/73 56/11.9 |
| 5,715,662 A | * | 2/1998 | Walters | A01D 34/664 464/32 |
| 5,784,866 A | * | 7/1998 | Campbell | A01D 34/665 56/13.6 |
| 5,809,757 A | * | 9/1998 | McLean | A01D 34/665 56/13.6 |
| 7,661,253 B2 | * | 2/2010 | Pruitt | A01D 34/665 56/13.6 |
| 7,730,703 B1 | * | 6/2010 | Ehrhart | A01D 34/665 56/13.6 |
| 8,020,363 B1 | | 9/2011 | Barnett et al. | |
| 9,717,175 B2 | * | 8/2017 | Fay, II | A01D 34/665 |
| 2009/0071116 A1 | * | 3/2009 | Barnett | A01D 34/668 56/153 |
| 2010/0205925 A1 | * | 8/2010 | Thompson | A01D 34/733 56/255 |
| 2018/0027728 A1 | * | 2/2018 | Honey | A01D 34/13 |

FOREIGN PATENT DOCUMENTS

| | | |
|---|---|---|
| EP | 3213623 A1 | 9/2017 |
| FR | 1094356 A | 5/1955 |

* cited by examiner

ROTARY SICKLE CUTTING SYSTEM FOR AN AGRICULTURAL VEHICLE HAVING A PLURALITY OF CUTTING UNITS WITH A ROTATABLE DISC AND GUARD ASSEMBLY

BACKGROUND

Agricultural vehicles such as mowers, combine harvesters, windrowers, and forage harvesters, are equipped with one or more cutting elements to sever crops and other plant material in a field. Many different styles of cutting elements exist, depending on the application and desired cut characteristics. Mowers for cutting hay, for example, may be equipped with disc-type cutting elements that rotate to cut hay as the mower travels across the field. Alternatively, the mower may be equipped with sickle-type cutting elements that reciprocate to cut crop material as the mower travels across a field.

SUMMARY

The present disclosure relates to a header for an agricultural vehicle with multiple cutting units that each have a rotatable disc carrying a plurality of knives that can each rotate through knife slots defined between top guard portions and bottom guard portions of a guard assembly.

In some exemplary embodiments disclosed herein, an agricultural vehicle includes a chassis and a header carried by the chassis that includes a cutterbar assembly with a plurality of cutting units. Each of the cutting units includes a rotatable disc carrying a plurality of knives each defining at least one cutting edge and a guard assembly including a plurality of extensions. Each of the extensions includes a bottom guard portion connected to a top guard portion to define a knife slot that allows the plurality of knives to pass through during rotation of the disc. At least one rotary driver couples to the rotatable disc of at least one of the cutting units.

In some exemplary embodiments disclosed herein, a header for an agricultural vehicle includes a header frame and a cutterbar assembly with a plurality of cutting units carried by the header frame. Each of the cutting units includes a rotatable disc carrying a plurality of knives each defining at least one cutting edge and a guard assembly including a plurality of extensions. Each of the extensions includes a bottom guard portion connected to a top guard portion to define a knife slot that allows the plurality of knives to pass through during rotation of the disc. At least one rotary driver couples to the rotatable disc of at least one of the cutting units.

One possible benefit that may be realized by exemplary embodiments disclosed herein is the extensions of the guard assemblies can act to hold crop material as the knives pass through the knife slots, allowing for the scissor-like cutting action of a sickle mower while rotating at the speed of a disc mower.

Another possible benefit that may be realized by exemplary embodiments disclosed herein is the rotatable discs can be relatively lightweight due to protection by the guard assemblies, reducing the power requirements to rotate the discs.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed harvester and header, reference is made to the accompanying figures, wherein.

DETAILED DESCRIPTION

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "plurality" as used herein is defined as any amount or number greater or more than 1. In some embodiments, the term "plurality" means 2, 3, 4, 5, 6 or more.

The terms "left" and "right" are used herein as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes.

The terms "crops" and "crop material" are used herein to refer to any type of plant and/or vegetation that is intentionally planted for collection. Exemplary crops and crop material may include hay, wheat, and corn, but it should be appreciated that the embodiments disclosed herein are not limited to applications for collecting crops and crop material. Embodiments disclosed herein may be used, for example, to mow a field and sever other types of plant material such as grass, various varieties of weeds, etc.

The term "agricultural vehicle" is used herein to refer to an assembly of various elements that work in conjunction to travel and perform various tasks related to agriculture, such as removing crops, crop material, or other plant material from a field. Exemplary agricultural vehicles include, but are not limited to, vehicles that are commonly referred to as mowers, windrowers, spreaders, windrow inverters, and combine harvesters.

Many of the fastening, connection, processes and other components utilized in this disclosure are widely known and used in the field of the disclosure described, and their exact nature or type is not necessary for an understanding and use of the disclosure by a person skilled in the art, and they will not therefore be discussed in significant detail. Furthermore, the various components shown or described herein for any specific application of this disclosure can be varied and the practice of a specific application of any element may already be widely known or used in the art by persons skilled in the art and each will likewise not therefore be discussed in significant detail.

Figure 1:
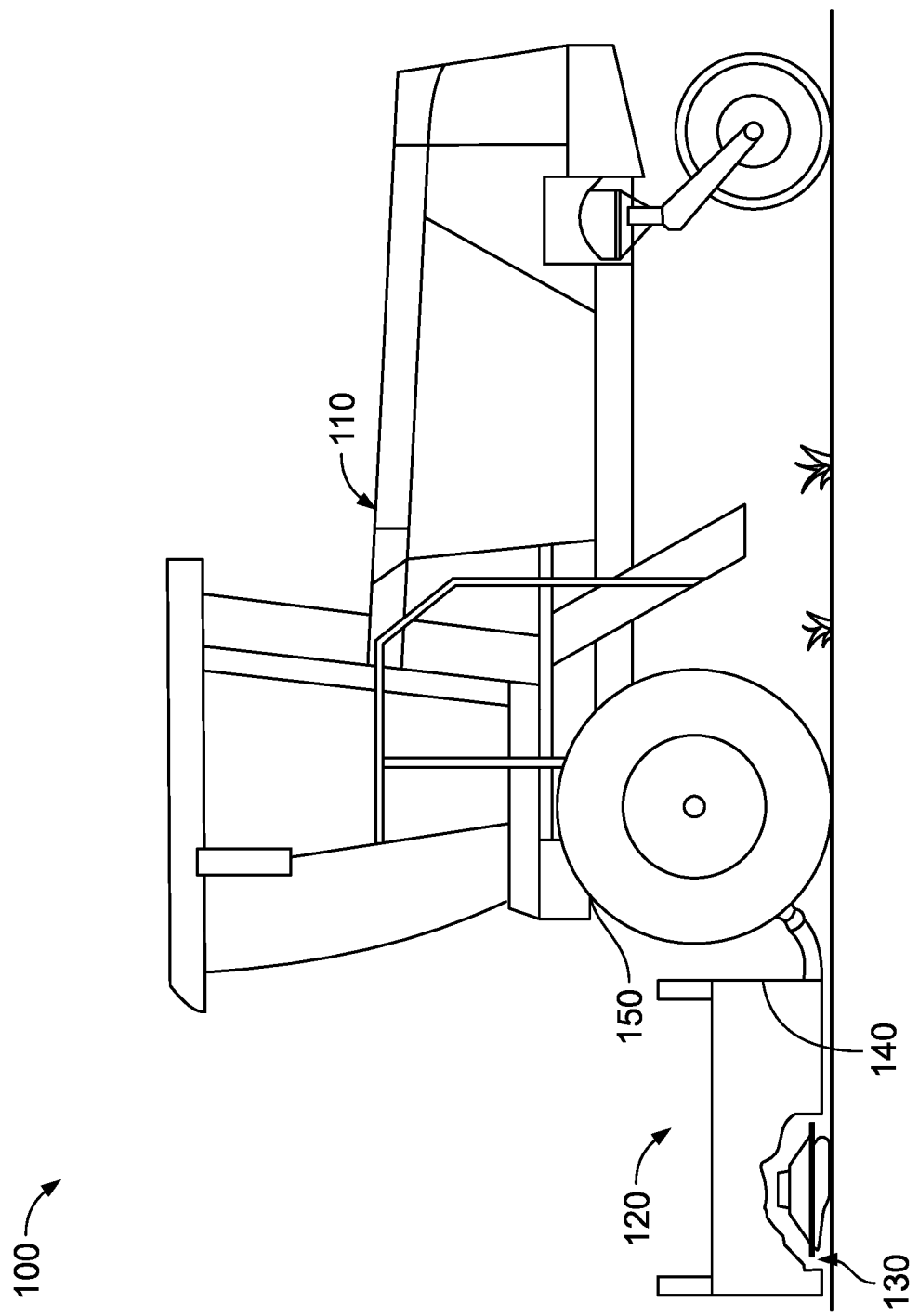
FIG. 1 is a side view of an agricultural vehicle carrying a header formed in accordance with the present disclosure.

Referring now to the drawings and particularly to FIG. 1, an exemplary embodiment is illustrated of a self-propelled agricultural vehicle 100 including a tractor 110 carrying a forwardly disposed header 120. While the agricultural vehicle 100 is illustrated in the form of a self-propelled vehicle, in some embodiments the header 120 is included in a vehicle that is pulled or otherwise carried by, for example, a user or another vehicle. Such agricultural vehicles are well-known in the art for offering a way to sever crops or other plants. The header 120 includes a cutterbar 130 disposed adjacent the forward end of the header 120 to sever standings crop or other plants from the ground. The cutterbar 130 is carried by a header frame HO that connects to a chassis 150 of the tractor 110 to allow the tractor 110 to push the header 120 across terrain. While the header 120 is illustrated as being pushed by the tractor 110, it should be appreciated that the header 120 operates similarly when pulled across terrain.

Figure 2:
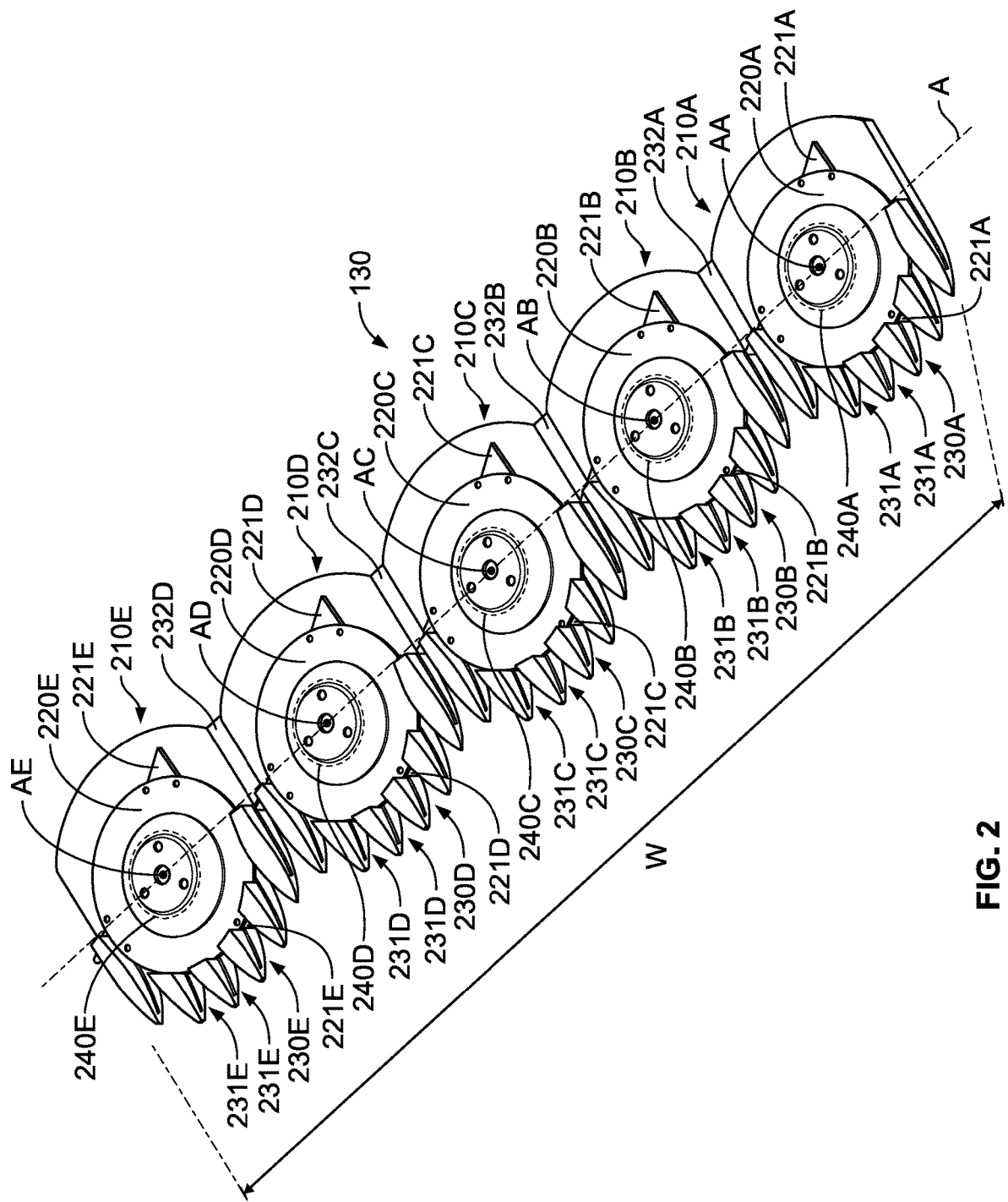
FIG. 2 is a perspective view of a cutterbar of the header shown in FIG. 1.

Referring now to FIG. 2, an exemplary embodiment of the cutterbar 130 is illustrated that includes a plurality of cutting units, shown as five cutting units 210A, 210B, 210C, 210D, 210E. It should be appreciated that while five cutting units 210A, 210B, 210C, 210D, 210E are illustrated, fewer than five cutting units, i.e., two, three, or four cutting units, or more than five cutting units may be incorporated in the cutterbar 130. In some embodiments, the cutting units 210A, 210B, 210C, 210D, 210E are positioned side-by-side across a width W of the header frame 140, and therefore the header 120, to sever crops or other plant material across the width W of the header 120. Each of the cutting units 210A, 210B, 210C, 210D, 210E includes a respective rotatable disc 220A, 220B, 220C, 220D, 220E each carrying a plurality of respective knives 221A, 221B, 221C, 221D, 221E. Each of the cutting units 210A, 210B, 210C, 210D, 210E also includes a respective guard assembly 230A, 230B, 230C, 230D, 230E having a plurality of respective extensions 231A, 231B, 231C, 231D, 231E. Each of the rotatable discs 220A, 220B, 220C, 220D, 220E can rotate about a respective axis of rotation AA, AB, AC, AD, AE when driven by one or more coupled rotary drivers, illustrated as five rotary drivers 240A, 240B, 240C, 240D, 240E. While each of the rotatable discs 220A, 220B, 220C, 220D, 220E is illustrated as being coupled to a respective rotary driver 240A, 240B, 240C, 240D, 240E, in some embodiments multiple discs may be rotatably driven by a single rotary driver. In some embodiments, the respective axes of rotation AA, AB, AC, AD, AE are aligned with one another on an alignment axis A spanning the width W of the header frame 140. In some embodiments, the guard assemblies 230A, 230B, 230C, 230D, 230E are connected to one another by connecting portions 232A, 232B, 232C, 232D disposed between adjacent guard assemblies 230A, 230B, 230C, 230D, 230E.

Figure 3:
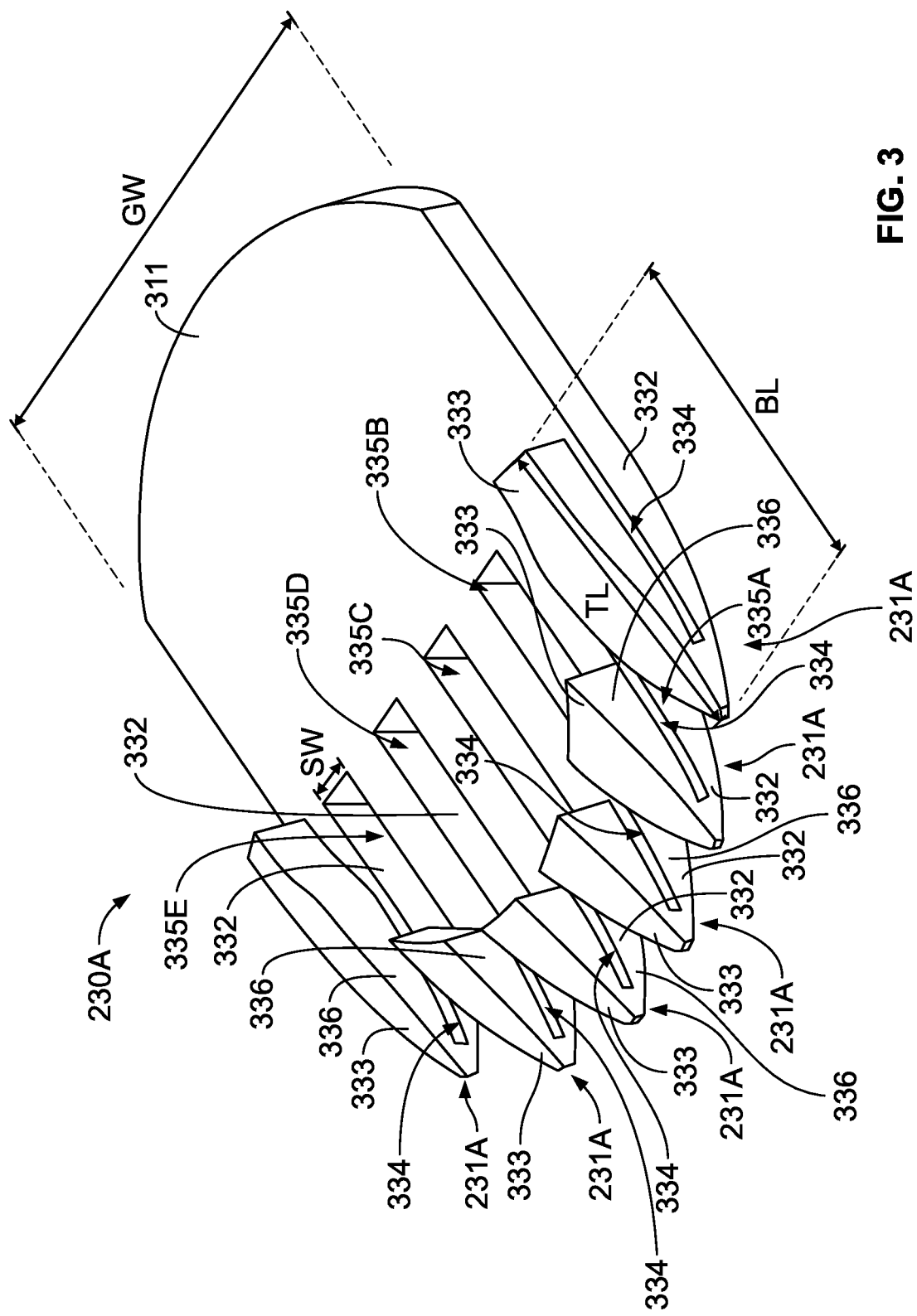
FIG. 3 is a perspective view of a guard assembly of the cutterbar shown in FIG. 2.

Referring now to FIG. 3, an exemplary embodiment of one of the guard assemblies 230A is illustrated. It should be appreciated that while only guard assembly 230A is illustrated in FIG. 3, the guard assemblies 230B, 230C, 230D, 230E can be similar, or identical, to the guard assembly 230A. The guard assembly 230A may include a base portion 311 that, in some embodiments, connects to base portions of an adjacent guard assembly, such as guard assembly 230B, by the connecting portion 232A. In some embodiments, the rotary driver 240A rotatably coupled to the rotatable disc 220A is rigidly mounted to the base portion 311 and the rotatable disc 220A. Rigidly mounting the rotary driver 240A to the base portion 311 and rotatable disc 220A can limit the amount of tilt or pivoting about the pivot axis AA that the disc 220A experiences during rotation to improve cut consistency.

The extensions 231A of the guard assembly 230A can extend from the base portion 311, as illustrated. Each extension 231A includes a bottom guard portion 332 that connects to a top guard portion 333 to define a knife slot 334 between the bottom guard portion 332 and the top guard portion 333. The distance between the bottom guard portion 332 and the top guard portion 333, and thus the height of the knife slot 334, is larger than a thickness of the knives 221A so there is some clearance between the guard portions 332, 333 and the rotating knives 221A during use. In some embodiments, the top guard portion 333 is cantilevered from the bottom guard portion 332 and defines a top guard length TL less than a bottom guard length BL of its respectively connected bottom guard portion 332. As can be appreciated from FIG. 3, the bottom guard portions 332 and the top guard portions 333 of the extensions 231A may have differing lengths, depending on the relative position of the extension 231A. The top guard portion 333 may be integrally formed with the bottom guard portion 332, which may be integrally formed with the base portion 311, by, for example, molding the guard assembly 230A from relatively strong and durable materials such as steel, ductile iron, or various polymers.

The extensions 231A, and their respective knife slots 334, are arranged so the knives 221A of the rotatable disc 220A can rotate through the knife slots 334 during rotation of the disc 220A. In this respect, the guard portions 332, 333 of the extensions 231A protect the knives 221A during rotation from objects such as, for example, rocks and increase the operational lifetime of the knives 221A. The extensions 231A may be laterally spaced apart from each other across a guard width GW of the guard assembly 230A to define a plurality of crop slots 335A, 335B, 335C, 335D, 335E between the extensions 231A. The crop slots 335A, 335B, 335C, 335D, 335E may each define a crop slot width SW that is close to the width of crops or other plant material that the header 120 will be severing, as will be described further herein. In some exemplary embodiments, the crop slot widths SW may be from about 2.5 centimeters to about 5 centimeters. In some embodiments, the crop slot widths SW may be between about 2.0 and 3.0 times a width of an extension, such as extension 231A.

Figure 4:
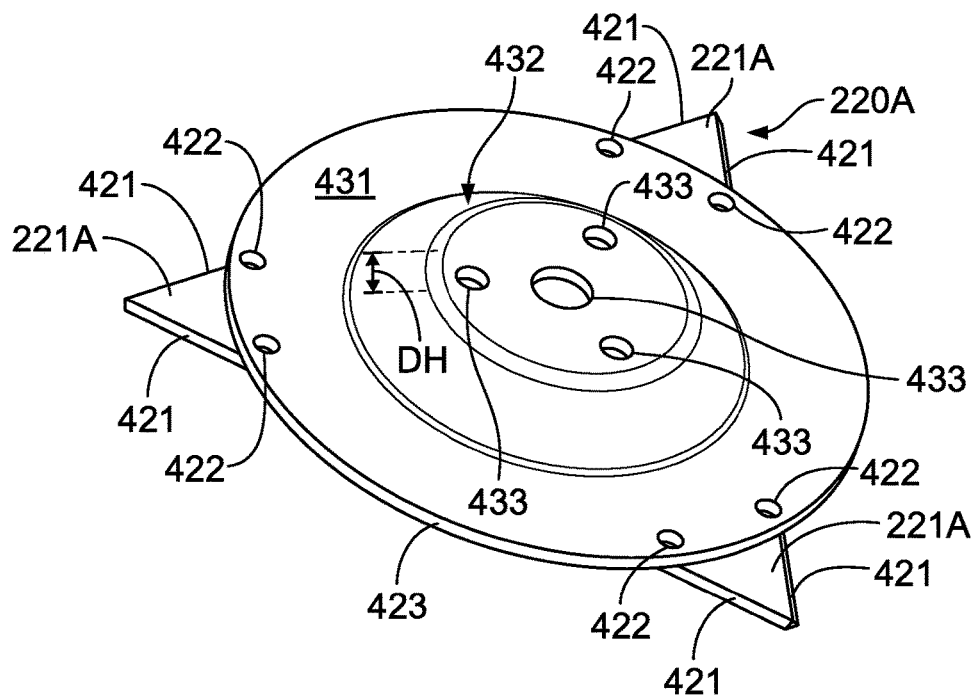
FIG. 4 is a perspective view of a rotatable disc of the cutterbar shown in FIG. 2.

Referring now to FIG. 4, an exemplary embodiment of the rotatable disc 220A of the cutting unit 210A is illustrated. The rotatable disc 220A carries a plurality of knives, shown as three knives 221A in FIGS. 2 and 4, which each define at least one respective cutting edge 421 for severing crops and other plant material. In some embodiments, the disc 220A carries fewer than three knives, i.e., one or two knives, or more than three knives. In some embodiments, the knives 221A are equidistant from adjacent knives about the disc 220A. While the disc 220A is illustrated in FIG. 4 as having a substantially circular shape, in some embodiments the disc may be formed with an irregular round shape, such as an oval or elliptical shape, as will be described further herein. In some embodiments, the knives 221A comprise a metal, such as steel, as a base material that is sharpened at the cutting edge(s) 421 and may be coated with another material, such as tungsten carbide, to improve the durability of the cutting edge(s) 421. Each of the knives 221A may extend radially outward from the disc 220A past a circumference 423 of the disc 220A so only the knives 221A, but not the disc 220A itself, pass through the knife slots 334 of the guard assembly 230A. The knives 221A may be removably mounted to the disc 220A by bolting or otherwise attaching the knives 221A to the disc 220A at attachment points 422, illustrated as openings formed in the disc 220A, to replace knives 221A that are, for example, broken or dull.

In some embodiments, the rotatable disc 220A has a flat portion 431 surrounding a domed portion 432. The knives 221A may attach to the flat portion 431 so the knives 221A of the disc 220A are all generally planar with one another to encourage an even cut of plant material. The domed portion 432 has a plurality of openings 433 for attaching to the rotary driver 240A, which is positioned between the domed portion 432 and the base portion 311 of the guard assembly 230A. A dome height DH of the domed portion 432, relative to the flat portion 431, may be adjusted to accommodate the rotary driver 240A, with the dome height DH depending on the size of the housed rotary driver 240A. In some embodiments, the disc 220A is rigidly mounted to the rotary driver 240A so the disc 220A stays generally perpendicular to its axis of rotation AA during operation. When the rotary driver 240A is electrically powered, a wire or other electrical coupler may extend through one of the openings 433 to electrically couple the rotary driver 240A to a power source, which may be a battery or alternator of the vehicle 110.

Figure 5:
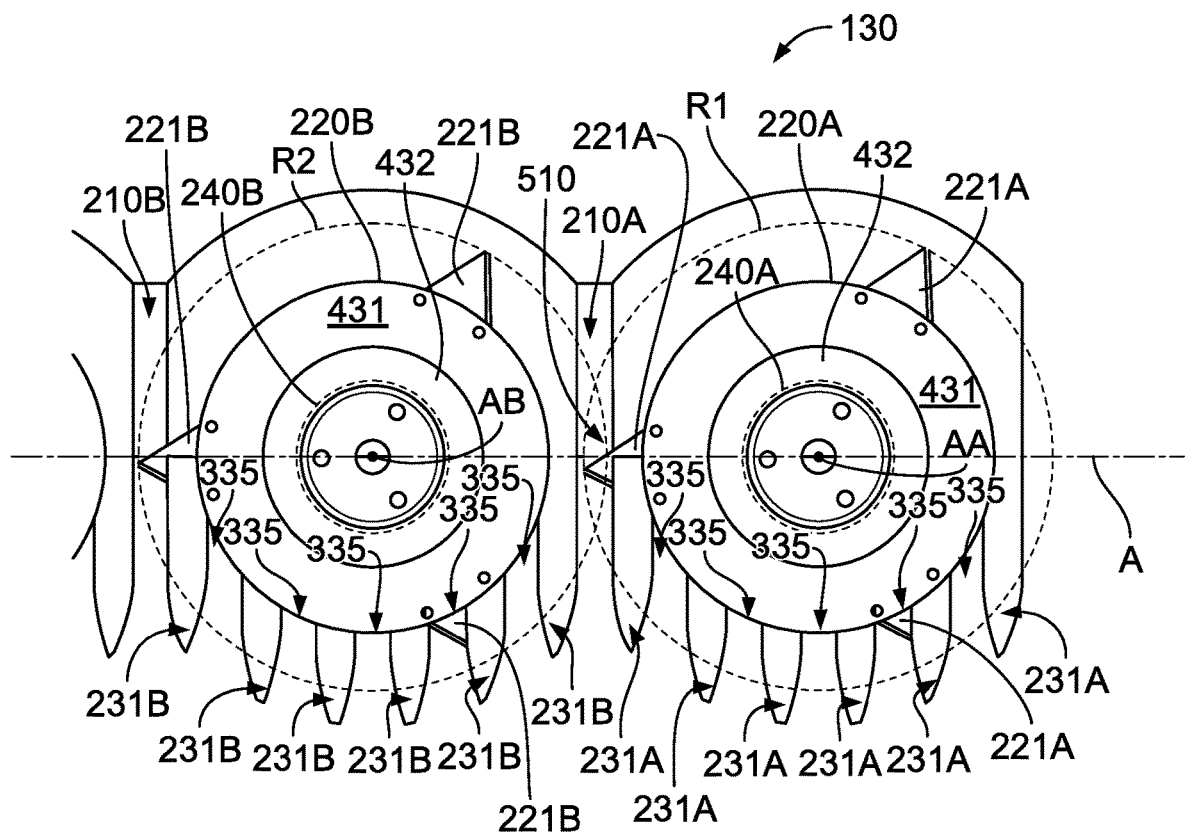
FIG. 5 is a top view of a portion of the cutterbar shown in FIG. 2.

To illustrate operation of the cutterbar 130, and referring now to FIG. 5, a portion of the cutterbar 130 is illustrated in top view. For ease of reference, the cutting unit 210A is referred to as a "first cutting unit 210A" and the cutting unit 210B is referred to as a "second cutting unit 210B." Similarly, the respective components of each of the cutting units 210A, 210B are referred to in "first" and "second" nomenclature for ease of reference. As shown, the first disc 220A and the second disc 220B are both in a similar orientation relative to their respective axes AA, AB. As the discs 220A, 220B rotate about their respective axes AA, AB, the knives 221A, 221B carried by the respective discs 220A, 220B rotate about the axes AA, AB through the knife slots 334 of the respective guard assemblies 230A, 230B. During each full rotation of the discs 220A, 220B, each of the knives 221A, 221B passes through the knife slots 334 defined in the guard assemblies 230A, 230B. As the vehicle 110 travels across terrain, crops or other plant material can be directed into the crop slots 335 between the extensions 231A, 231B. As the knives 221A, 221B rotate and pass through the knife slots 334, the knives 221A, 221B engage the material held in the crop slots 335 and slice through the material to sever the crops or other plant material from the terrain. Bending of the plant material in the crop slots 335 as the knives 221A, 221B engage the material is limited due to contact between the extensions 231A, 231B and the material. In this sense, the extensions 231A, 231B hold the material-to-be-cut in the crop slots 335 against the severing action of the knives 221A, 221B to promote a clean cut of the material.

The cutterbar 130 combines several useful features of both disc-type cutterbars and sickle-type cutterbars. The cutterbar 130 includes rotatable discs 220A, 220B, 220C, 220D, 220E carrying knives 221A, 221B, 221C, 221D, 221E to sever crops and other plant material. The discs 220A, 220B, 220C, 220D, 220E can continuously rotate in one direction, which requires relatively low amounts of power compared to reciprocating sickle-type cutterbars with cutting elements that constantly start and stop in two directions.

The extensions 231A, 231B, 231C, 231D, 231E of the guard assemblies 230A, 230B, 230C, 230D, 230E integrate what are sometimes known as a "rock guard" and a "knife guard" together to synergistically enhance the function of the cutterbar 130. The extensions 231A, 231B, 231C, 231D, 231E protect the discs 220A, 220B, 220C, 220D, 220E and knives 221A, 221B, 221C, 221D, 221E from objects, such as rocks, that may get forced into the path of the knives 221A, 221B, 221C, 221D, 221E during rotation, reducing the risk of damage to the cutterbar 130 and the risk of the objects being flung at high speeds from the cutterbar 130. The extensions 231A, 231B, 231C, 231D, 231E protecting the discs 220A, 220B, 220C, 220D, 220E and knives 221A, 221B, 221C, 221D, 221E also eliminates the need for the knives 221A, 221B, 221C, 221D, 221E to be pivotable during operation, allowing the use of rigidly mounted knives and lighter discs. Utilizing lighter discs can further reduce the power requirements of the cutterbar 130 and reduce the size of the rotary drivers 240A, 240B, 240C, 240D, 240E, allowing the use of lower profile discs that house the rotary driver under the domed portion 432.

Further, the extensions 231A, 231B, 231C, 231D, 231E provide holders for crop or other plant material as the material is being severed by the knives 221A, 221B, 221C, 221D, 221E. In this sense, the cutting action of the cutterbar 130 is similar to that of a sickle-type cutterbar, i.e., scissor-like cutting, but utilizes rotating discs 220A, 220B, 220C, 220D, 220E carrying knives 221A, 221B, 221C, 221D, 221E rather than reciprocating cutting elements. The cutting action of the cutterbar 130, therefore, can produce a consistent cut throughout a field or other terrain without having the comparatively power inefficient reciprocating cutting motion of a sickle-type cutterbar. In some embodiments, the top guard portion 333 of the extensions 231A, 231B, 231C, 231D, 231E also has a sharpened edge 336 (shown in FIG. 3) to assist with the scissor-like cutting action of the cutterbar 130 and cleanly sever crops or other plant material. The sharpened edge 336 may be on only one lateral side of the top guard portion 333 or, in some embodiments, on both lateral sides of the top guard portion 333.

In some embodiments, the knives 221A of the first cutting unit 210A define a first rotational region, illustrated as a circle R1 about the axis AA in FIG. 5, and the knives 221B of the second cutting unit 210B define a second rotational region, illustrated as a circle R2 about the axis AB in FIG. 5, that partially overlaps the first rotational region R1. To prevent collision between the knives 221A and the knives 221B, the orientation and rotation of the discs 220A, 220B can be coordinated such that the knives 221A, 221B do not normally cross one another in the overlap. For example, the discs 220A, 220B can be oriented so none of the respective knives 221A, 221B overlap in a potential overlap region 510 defined between the first cutting unit 210A and the second cutting unit 210B. Rotating the discs 220A, 220B at the same rotational speed, therefore, prevents collision of the knives 221A, 221B during normal operation.

Figure 6:
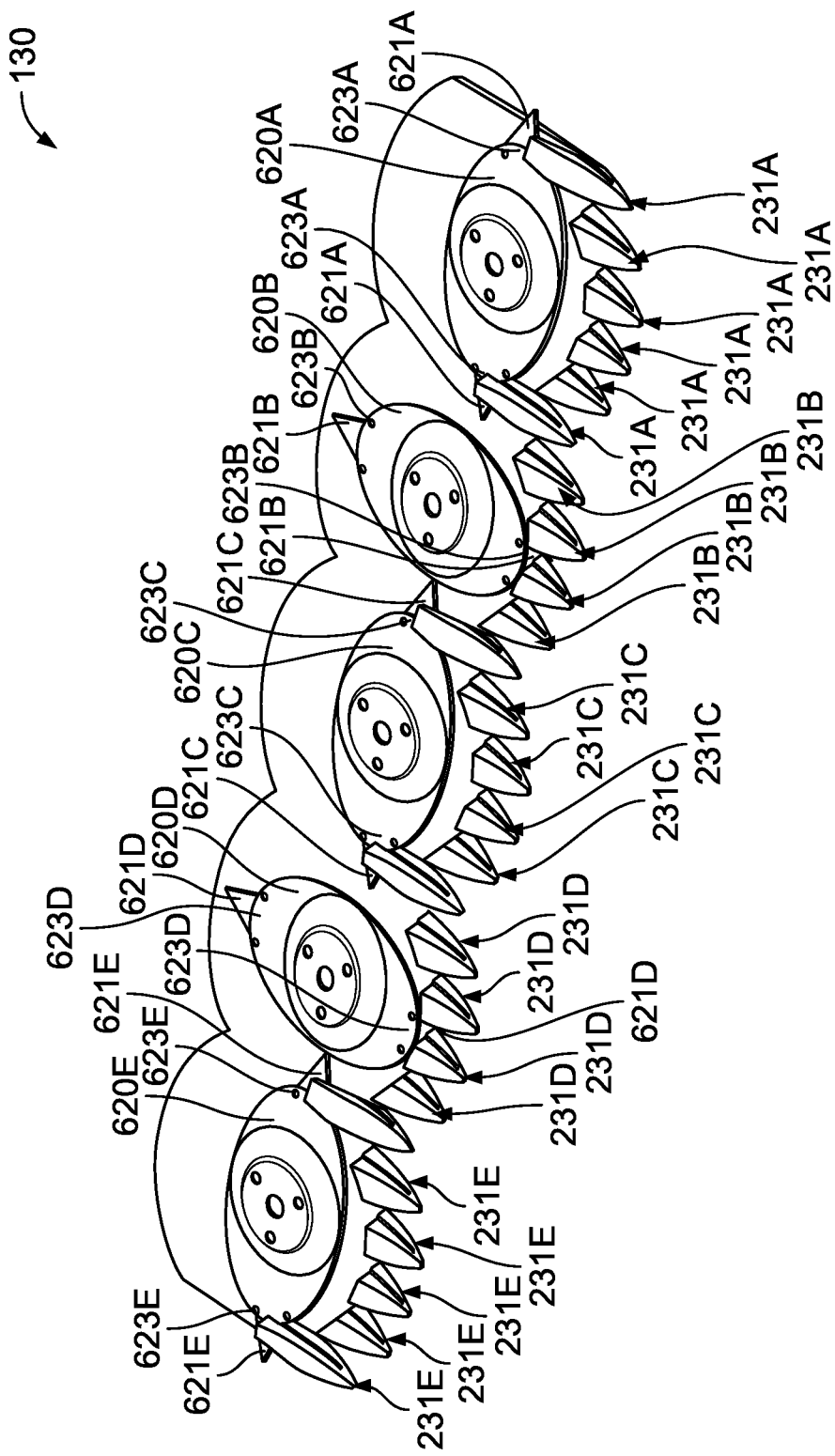
FIG. 6 is a perspective view of the cutterbar shown in FIGS. 2 and 5 with ellipsoid shaped discs.

As previously described, the rotatable discs of the cutterbar 130 may have shapes that are not circular and may carry less than three knives. Referring now to FIG. 6, the cutterbar 130 is shown with rotatable discs 620A, 620B, 620C, 620D, 620E that each have an elliptical, rather than circular, shape and carry two knives 621A, 621B, 621C, 621D, 621E, rather than three. In other respects, the cutterbar 130 remains unchanged. Each elliptical disc 620A, 620B, 620C, 620D, 620E may carry its respective knives 621A, 621B, 621C, 621D, 621E at opposing longitudinal ends 623A, 623B, 623C, 623D, 623E of the disc 620A, 620B, 620C, 620D, 620E. In some embodiments, the elliptical discs 620A, 620B, 620C, 620D, 620E carry knives 621A, 621B, 621C, 621D, 621E that significantly overlap into the rotation region of adjacent discs and knives.

Figure 7:
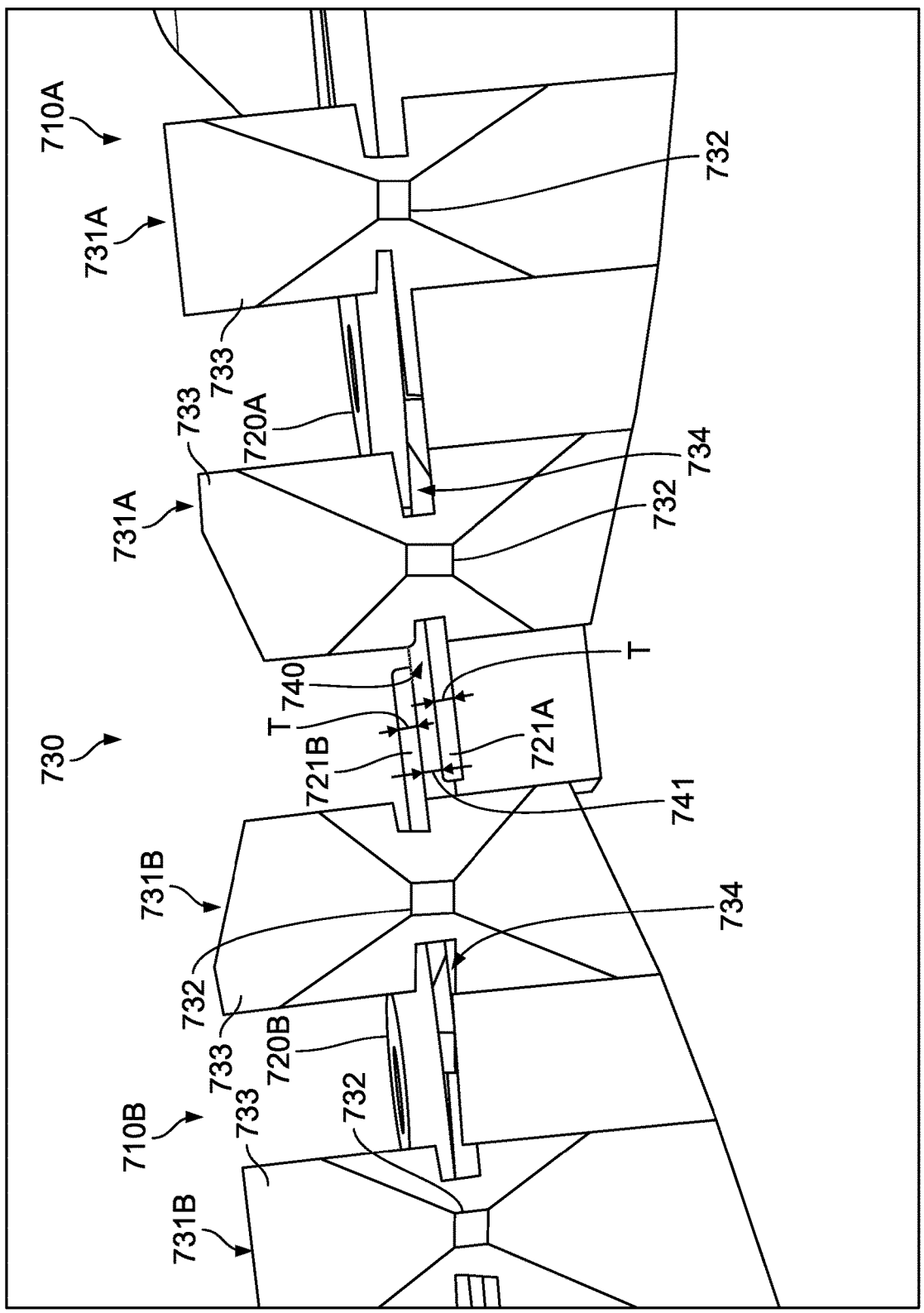
FIG. 7 is a front view of an alternative embodiment of a cutterbar having vertically offset discs.

To reduce the risk of discs and/or carried knives being damaged during irregular rotation of the discs, e.g., if one of the discs binds during use, and referring now to FIG. 7, an alternative embodiment of a cutterbar 730 includes a first rotatable disc 720A carrying first knives 721A of a first cutting unit 710A that are vertically offset from knives 721B carried by a second rotatable disc 720B of a second cutting unit 710B. As used herein, the knives 721A of the first rotatable disc 720A are "vertically offset" from the knives 721B carried by the second rotatable disc 720B in the sense that the knives 721A, 721B rotate in respective planes that are separated from one another by a gap 740, which is illustrated as a vertical gap relative to the ground in FIG. 7. Vertically offsetting the respective knives 721A, 721B can reduce the risk of the knives 721A of the first cutting unit 710A impacting the knives 721B of the second cutting unit 710B if, for example, one of the discs 720A, 720B binds during operation. In some embodiments, the knife thickness T of the first knives 721A is the same as the knife thickness T of the second knives 721B. In some embodiments, the knife thickness T of the first knives 721A and second knives 721B is between about 1.0 mm to about 4.0 mm. The offset between the rotation plane defined by the knives 721A and the rotation plane defined by the knives 721B may be chosen as a multiple of the knife thickness T of the respective knives 721A, 721B. In some embodiments, the multiple may be between about 1.5 to about 2.0 times the knife thickness T to reduce the risk of the knives 721A, 721B impacting during irregular rotation while also maintaining an acceptably even cut. For example, when the knife thickness T of the knives 721A, 721B is 3 mm, the respective rotation planes of the knives 721A, 721B may be offset 6 mm from each other, as indicated by the arrow 741 in FIG. 7, so the resulting gap 740 between the knives 721A, 721B is approximately 3 mm. In all other respects, the cutterbar 730 may have similar features to the previously described cutterbar 130, including extensions 731A, 731B with bottom guard portions 732 and top guard portions 733 connected to the bottom guard portions 732 to form knife slots 734 that allow the knives 721A, 721B to rotate through during rotation of the discs 720A, 720B.

While exemplary embodiments have been described herein, it is expressly noted that these embodiments should not be construed as limiting, but rather that additions and modifications to what is expressly described herein also are included within the scope of the present disclosure. Moreover, it is to be understood that the features of the various embodiments described herein are not mutually exclusive and can exist in various combinations and permutations, even if such combinations or permutations are not made express herein, without departing from the spirit and scope of the present disclosure.

The invention claimed is:

1. An agricultural vehicle, comprising:
  a chassis;
  a header carried by the chassis, the header including a cutterbar assembly with a plurality of cutting units, each of the cutting units including:
    a rotatable disc carrying a plurality of knives each defining at least one cutting edge; and
    a guard assembly including a plurality of extensions, each of the extensions including a bottom guard portion connected to a top guard portion to define a knife slot that allows the plurality of knives to pass through during rotation of the disc; and
  at least one rotary driver coupled to the rotatable disc of at least one of the cutting units,
  wherein the plurality of cutting units include a first cutting unit and a second cutting unit, the first cutting unit and the second cutting unit being positioned such that the plurality of knives of the first cutting unit define a first rotational region and the plurality of knives of the second cutting unit define a second rotational region that partially overlaps the first rotational region.

2. The agricultural vehicle of claim 1, wherein each of the extensions is laterally spaced apart from at least one other adjacent extension to define a crop slot therebetween.

3. The agricultural vehicle of claim 1, wherein the top guard portion is cantilevered to the bottom guard portion.

4. The agricultural vehicle of claim 1, wherein the plurality of cutting units are positioned side-by-side across a width of the header.

5. The agricultural vehicle of claim 1, wherein the plurality of knives of the first cutting unit are vertically offset from the plurality of knives of the second cutting unit.

6. The agricultural vehicle of claim 1, wherein each of the plurality of cutting units includes at least three knives.

7. The agricultural vehicle of claim 1, wherein each of the rotatable discs is rotatably connected to an associated rotary driver.

8. The agricultural vehicle of claim 1, wherein the plurality of knives extend radially from a circumference of the rotatable disc.

9. The agricultural vehicle of claim 1, wherein the first cutting unit includes a first bottom guard portion connected to a second bottom guard portion of the second cutting unit.

10. A header for an agricultural vehicle, comprising:
  a header frame;
  a cutterbar assembly with a plurality of cutting units carried by the header frame, each of the cutting units including:
    a rotatable disc carrying a plurality of knives each defining at least one cutting edge; and
    a guard assembly including a plurality of extensions, each of the extensions including a bottom guard portion connected to a top guard portion to define a knife slot that allows the plurality of knives to pass through during rotation of the disc; and
  at least one rotary driver coupled to the rotatable disc of at least one of the cutting units,
  wherein the plurality of cutting units include a first cutting unit and a second cutting unit, and the plurality of knives of the first cutting unit are vertically offset from the plurality of knives of the second cutting unit.

11. The header of claim 10, wherein each of the extensions is laterally spaced apart from at least one other adjacent extension to define a crop slot therebetween.

12. The header of claim 10, wherein the top guard portion is cantilevered to the bottom guard portion.

13. The header of claim 10, wherein the plurality of cutting units are positioned side-by-side across a width of the header frame.

14. The header of claim 13, wherein the first cutting unit and the second cutting unit are positioned such that the plurality of knives of the first cutting unit define a first rotational region and the plurality of knives of the second cutting unit define a second rotational region that partially overlaps the first rotational region.

15. The header of claim 10, wherein each of the plurality of cutting units includes at least three knives.

16. The header of claim 10, wherein each of the rotatable discs is rotatably connected to an associated rotary driver.

17. The header of claim 10, wherein the plurality of knives extend radially from a circumference of the rotatable disc.

18. The header of claim 10, wherein the first cutting unit includes a first guard assembly connected to a second guard assembly of the second cutting unit.

19. A header for an agricultural vehicle, comprising:
- a header frame;
- a cutterbar assembly with a plurality of cutting units carried by the header frame, each of the cutting units including:
  - a rotatable disc carrying a plurality of knives each defining at least one cutting edge; and
  - a guard assembly including a plurality of extensions, each of the extensions including a bottom guard portion connected to a top guard portion to define a knife slot that allows the plurality of knives to pass through during rotation of the disc, and wherein the top guard portion includes a sharpened edge; and
- at least one rotary driver coupled to the rotatable disc of at least one of the cutting units.

20. The header of claim 19, wherein the plurality of cutting units include a first cutting unit and a second cutting unit, the first cutting unit and the second cutting unit being positioned such that the plurality of knives of the first cutting unit define a first rotational region and the plurality of knives of the second cutting unit define a second rotational region that partially overlaps the first rotational region, and wherein the plurality of knives of the first cutting unit are vertically offset from the plurality of knives of the second cutting unit.

* * * * *